United States Patent
Park et al.

(10) Patent No.: US 11,558,476 B2
(45) Date of Patent: Jan. 17, 2023

(54) METHOD AND APPARATUS FOR RENEWING SUBSCRIPTION FOR NETWORK DATA ANALYSIS IN WIRELESS COMMUNICATION SYSTEM

(71) Applicant: Samsung Electronics Co., Ltd., Suwon-si (KR)

(72) Inventors: Jungshin Park, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/489,027

(22) Filed: Sep. 29, 2021

(65) Prior Publication Data
US 2022/0103644 A1    Mar. 31, 2022

(30) Foreign Application Priority Data
Sep. 29, 2020 (KR) .................. 10-2020-0127302

(51) Int. Cl.
*H04L 67/51* (2022.01)
*H04L 43/06* (2022.01)
(Continued)

(52) U.S. Cl.
CPC .............. *H04L 67/51* (2022.05); *H04L 41/14* (2013.01); *H04L 43/06* (2013.01); *H04L 43/08* (2013.01); *H04L 43/50* (2013.01)

(58) Field of Classification Search
None
See application file for complete search history.

(56) References Cited

U.S. PATENT DOCUMENTS 8,228,084 B1 * 7/2012 Chen ................ G11C 29/12005
324/750.1
10,264,060 B1 * 4/2019 Rao ...................... H04L 43/0876
(Continued)

FOREIGN PATENT DOCUMENTS

DE    112018002701 T5 *  2/2020  .............. H04M 1/00
WO   WO-2007146707 A2 * 12/2007  ........... G06F 16/381
(Continued)

OTHER PUBLICATIONS

3GPP; TSG SA; Study on enablers for network automation for the 5G System (5GS); Phase 2 (Release 17), 3GPP TR 23.700-91 V1.0.0, Sep. 11, 2020.
(Continued)

*Primary Examiner* — Lance Leonard Barry
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method for renewing a subscription for network data collection and analysis in a wireless communication system.

20 Claims, 7 Drawing Sheets

(51) Int. Cl.
  *H04L 43/50* (2022.01)
  *H04L 43/08* (2022.01)
  *H04L 41/14* (2022.01)

(56) References Cited

U.S. PATENT DOCUMENTS

| | | | | |
|---|---|---|---|---|
| 2003/0195946 | A1* | 10/2003 | Yang | H04L 45/306 709/219 |
| 2006/0259629 | A1* | 11/2006 | Usmani | H04W 24/08 709/227 |
| 2009/0024628 | A1* | 1/2009 | Angel | G06Q 20/40 707/999.009 |
| 2019/0356558 | A1* | 11/2019 | Han | H04L 41/5009 |
| 2020/0112868 | A1* | 4/2020 | Shariat | H04W 8/08 |
| 2020/0112921 | A1* | 4/2020 | Han | H04W 76/27 |

FOREIGN PATENT DOCUMENTS

| | | | |
|---|---|---|---|
| WO | 2019/158777 A1 | 8/2019 | |
| WO | 2020/143926 A1 | 7/2020 | |
| WO | WO-2021136598 A1 * | 7/2021 | ......... H04L 41/0604 |
| WO | WO-2022023800 A1 * | 2/2022 | |

OTHER PUBLICATIONS

3GPP; TSG SA; System architecture for the 5G System (5GS); Stage 2 (Release 16), 3GPP TS 23.501 V16.6.0, Sep. 24, 2020.
3GPP; TSG SA; Architecture enhancements for 5G System (5GS) to support network data analytics services (Release 16), 3GPP TS 23.288 V16.5.0, Sep. 25, 2020.
International Search Report dated Dec. 28, 2021, issued in International Patent Application No. PCT/KR2021/013339.

* cited by examiner

METHOD AND APPARATUS FOR RENEWING SUBSCRIPTION FOR NETWORK DATA ANALYSIS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0127302, filed on Sep. 29, 2020, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for renewing a subscription for network data analysis in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A 5G mobile communication system defines a network data analytics function (NWDAF) that is a network function to analyze and provide data collected from a 5G network so as to support network automation. Accordingly, needs for a method for effectively renewing subscription information for NWDAF have emerged.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problem and/or disadvantages and to provide at least the advantages described below. Accordingly, an aspect of the disclosure is to provide a method and a device for configuring and renewing a service subscription for providing network data collection and analysis information between a network function and a network data analytics function for automating management of a wireless communication network.

Additional aspects will be set forth in part in the description which follows and, in part, will be apparent from the description, or may be learned by practice of the presented embodiments.

In accordance with an aspect of the disclosure, a method performed by a first network function (NF) in a wireless communication system is provided. The method includes receiving, from a second NF, a first message for requesting a subscription to a network data analysis service, the first message comprising first subscription information requested for the subscription and a first identifier associated with the subscription, in response to the first message, transmitting, to the second NF, a second message for accepting the subscription, the second message comprising second subscription information accepted for the subscription and a second identifier associated with the subscription, determining to change the second subscription information to third subscription information based on a predetermined condition, and transmitting, to the second NF, a third message comprising the third subscription information and at least one of the first identifier or the second identifier.

In accordance with another aspect of the disclosure, a method performed by a second network function (NF) in a wireless communication system is provided. The method includes transmitting, to a first NF, a first message for requesting a subscription to a network data analysis service, the first message comprising first subscription information requested for the subscription and a first identifier associated with the subscription, in response to the first message, receiving, from the first NF, a second message for accepting the subscription, the second message comprising second subscription information accepted for the subscription and a second identifier associated with the subscription, receiving, from the first NF, a third message comprising third subscription information and at least one of the first identifier or the second identifier, the third subscription information being changed from the second subscription information based on a predetermined condition, and renewing the subscription based on the third subscription information and the at least one of the first identifier or the second identifier.

In accordance with another aspect of the disclosure, a first network function (NF) in a wireless communication system is provided. The first NF includes a transceiver and at least one processor. The at least one processor is configured to receive, from a second NF via the transceiver, a first message for requesting a subscription to a network data analysis service, the first message comprising first subscription information requested for the subscription and a first identifier associated with the subscription, in response to the first message, transmit, to the second NF via the transceiver, a second message for accepting the subscription, the second message comprising second subscription information accepted for the subscription and a second identifier associated with the subscription, determine to change the second subscription information to third subscription information based on a predetermined condition, and transmit, to the second NF via the transceiver, a third message comprising the third subscription information and at least one of the first identifier or the second identifier.

In accordance with another aspect of the disclosure, a second network function (NF) in a wireless communication system is provided. The second NF includes a transceiver and at least one processor. The at least one processor is configured to transmit, to a first NF via the transceiver, a first message for requesting a subscription to a network data analysis service, the first message comprising first subscription information requested for the subscription and a first identifier associated with the subscription, in response to the first message, receive from the first NF via the transceiver, a second message for accepting the subscription, the second message comprising second subscription information accepted for the subscription and a second identifier associated with the subscription, receive, from the first NF via the transceiver, a third message comprising third subscription information and at least one of the first identifier or the second identifier, the third subscription information being changed from the second subscription information based on a predetermined condition, and renew the subscription based on the third subscription information and the at least one of the first identifier or the second identifier.

According to an embodiment of the disclosure, due to terminal movement or load distribution between network functions, a condition change of collected data, a condition change of analyzed data, resource relocation of a consumer network function or a provider network function, etc., if there is a need to change/replace/cancel data collection and analysis service subscription configured between a network data analytics function and a network function participating in a network automation operation, the consumer network function or the provider network function can, instead of canceling an existing subscription and reconfiguring a new subscription, change/replace/cancel the existing subscription by using a proposed method.

According to an embodiment of the disclosure, unnecessary signal message transmission that occurs during unsubscription and re-subscription can be prevented, and performance degradation due to resource reallocation can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
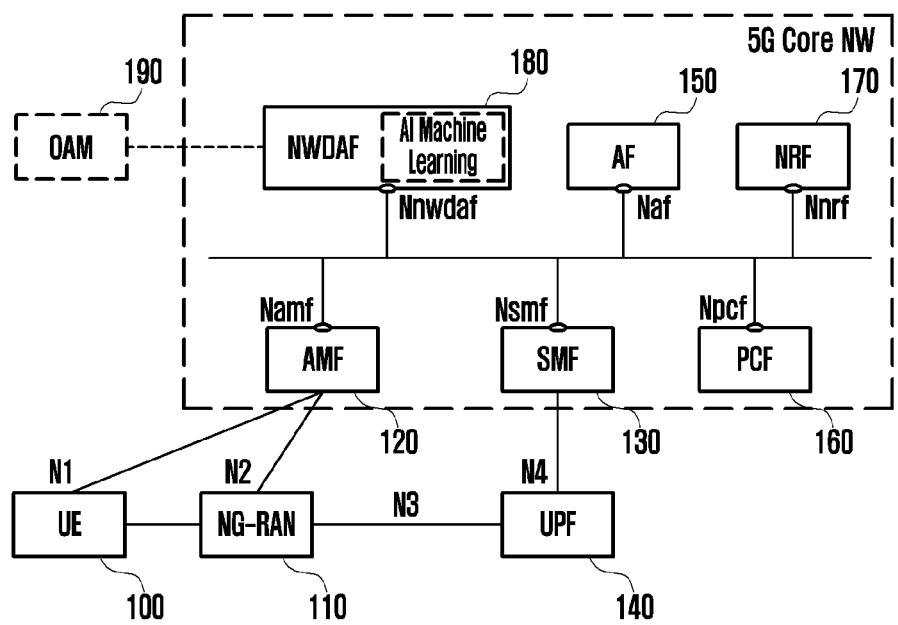
FIG. 1 is a diagram illustrating a structure of a network system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card.

Hereinafter, the operation principle of the disclosure will be described in detail with reference to the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names specified in LTE and NR standards, the latest standards defined by the 3rd generation partnership project (3GPP) group among existing standards, for the convenience of description. However, the disclosure is not limited by these terms and names, and may be applied in the same way to systems that conform other standards. Particularly, the disclosure may be applied to $3^{rd}$ generation partnership project new radio (3GPP NR) (5th generation wireless communication standard).

FIG. 1 is a diagram illustrating a structure of a network system according to an embodiment of the disclosure.

Referring to FIG. 1, descriptions of entities appearing in the disclosure may be described as follows. A terminal (or user equipment (UE)) 100 may access a 5G core network via a next generation-radio access network (NG-RAN, hereinafter, interchangeably used with 5G-RAN and RAN) 110. NG-RAN may refer to a base station that provides a wireless communication function to a terminal.

A unit for performing each of functions provided by a 5G network system may be defined as network function (NF). Representative NFs include an access and mobility management function (AMF) 120 configured to manage network access and mobility of a terminal, a session management function (SMF) 130 configured to perform a session-related function, user plane function (UPF) 140 configured to be responsible for transferring user data, an application function 150 (AF) configured to communicate with 5GC for provision, a policy and control function (PCF) 160 configured to manage a policy, a network repository function (NRF) 170 configured to store state information of NFs and have a function of processing a request to find an NF that other NFs are able to access, etc. However, NFs are not limited to the NFs listed above, and other NFs may be included. In addition to NF, there may be operations, administration and maintenance (OAM) 190 which is a system that manages a terminal and a 5G mobile communication network.

A 5G mobile communication system has defined a network data analytics function or network data collection and analytics function (NWDAF) 180 which is a network function that provides a function to analyze and provide data collected from a 5G network in order to support network automation. The NWDAF may collect/store/analyze information from the 5G network and may provide results to unspecified NFs, and the analysis results may be used independently by each NF. The NWDAF may collect information from the OAM, the NFs that constitute the 5G network, or the AF. As a representative analytics function of the NWDAF, a load level of a network slice instance may be collected and analyzed to be provided to a network slice selection function (NSSF) so as to be available for selection of a network slice that a specific UE may use. In this case, a service-based interface defined in the 5G network is used to transfer an analysis result value or to request analysis information between a specific NF and the NWDAF.

In the 5G network, the NWDAF which provides information collection and analytics functions may provide the following services. Of course, the disclosure is not limited to the following examples.

Analysis information subscription service (Nnwdaf_AnalyticsSubscription Service): An analysis information subscription service enables subscription and unsubscription of a network data analysis result generated by the NWDAF, and may be subdivided into methods enabling reception of the analysis result when a specific condition is satisfied or enabling periodic reception of the network analysis result, according to needs of the network function subscribing to the service. The analysis information subscription service may be provided via three operations of subscription, unsubscription, and notification.

If a specific NF wants a subscription (Nnwdaf_AnlayticsSubscription), factors transferred to the NWDAF by the specific NF in a subscription procedure may be divided into required inputs (Inputs, required) and optional inputs (Inputs, optional). According to some embodiments, the required inputs may include single network slice selection assistance information (S-NSSAI), an event identifier or analytics identifier, a notification target address, and event reporting information. Of course, the disclosure is not limited to the above examples. According to some embodiments, the optional inputs may include information additionally necessary for processing analysis information, and may include, typically, event filter or analysis information filter (event filter or analytics filter) information. Of course, the disclosure is not limited to the above examples.

In a case of an unsubscription operation (Nnwdaf_AnlayticsSubscription Unsubscribe), the NF may transfer, as the required input, subscription identifier information to the NWDAF, and the NWDAF may transfer a message, which indicates that unsubscription has been confirmed, as an output to the NF having requested the unsubscription.

In a notification operation (Nnwdaf_AnlayticsSubscription Notify), the NWDAF provides a notification of a designated network data analysis result periodically or when a specific condition is satisfied, to an NF successfully subscribing to the analysis information subscription service. Required input information of the notification operation may include an event identifier or analytics identifier, a notification target address, an identifier of a network slice instance, and load level information of network slice instance, and there may not be required output information. Of course, the required input information is not limited to the above example.

Analysis information request service (Nnwdaf_AnalyticsInfo service): Unlike the subscription service described above, an analysis information request service may refer to a service in which an NF requests analysis of specific information and receives a result value immediately after the request is completed. The operation of the analysis information request service may include a request and a response. The NF requesting analysis information may transmit an analysis information request message to the NWDAF.

For example, the NF may transfer, as required inputs of the analysis information request message, network slice instance network load information (load level information of network slice instance), an analysis information identifier (analytic ID), and additional factors required for analysis to the NWDAF. When the NWDAF receives the request from the NF, the NWDAF transmits, to the NF, an analysis result as a response. The requested slice load information may be transmitted in the response message.

In the disclosure, information provided by the NWDAF is not limited only to load information, and may include terminal moving information, a terminal/service communication pattern, an expected moving trajectory of a terminal/service, a terminal behavior-related factor (expected UE behavioral parameter), an expected service quality/experience (expected QoS, service experience), expected network performance information, and the like.

A result analyzed via the NWDAF may be transferred to respective NFs having requested the result, and the transferred analysis result may be used to optimize performance of network functions, such as quality of service (QoS) management, traffic control, mobility management, load distribution, and terminal power management, performed by the respective NFs.

Each element network function (NF), such as AMF, SMF, OAM, and RAN constituting a wireless network, may be a consumer NF that requests an analysis result of a network data analytics function (NWDAF). Alternatively, the each NF may be a service consumer NF of a network data analysis service. The NWDAF may perform a role of collecting and analyzing data from each NF in order to generate an analysis result requested from a consumer NF. The NWDAF may transfer the analysis result to the consumer NF that has transmitted the analysis request. Accordingly, the NWDAF may be a provider NF of the analysis result requested by the Consumer NF. Alternatively, the NWDAF may be a service provider NF of a service that provides the analysis result requested by the service consumer NF. Hereinafter, a service consumer NF and a consumer NF are not distinguished and may be simply referred to as a consumer NF. A service provider NF and a provider NF are not distinguished and may be simply referred to as a provider NF. A consumer NF may use an analysis result received from an NWDAF, in a procedure of determining a control parameter and an operation.

Figure 2:
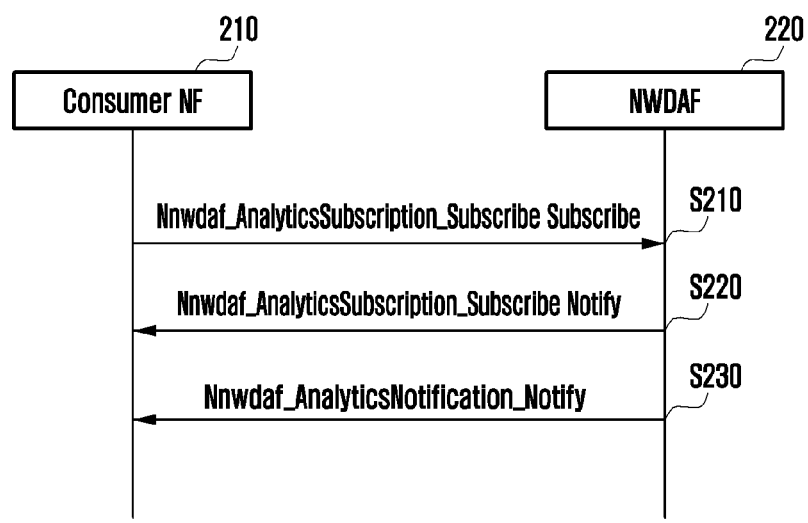
FIG. 2 is a flowchart illustrating a subscription procedure for a data analysis service performed between a service consumer network function and a network data analysis network function in order to use a network data analysis service according to an embodiment of the disclosure.

FIG. 2 is a flowchart illustrating a subscription procedure for a data analysis service performed between a provider NF and a consumer NF to request network data analysis in order to use a network data analytics function according to an embodiment of the disclosure.

Referring to FIG. 2, a provider NF that provides a network analysis service may be an NWDAF. A consumer NF 210 may request a service provided by the NWDAF 220.

Referring to FIG. 2, in operation S210, the consumer NF 210 may transfer a subscription request message for a corresponding service (e.g., Nnwdaf_AnalyticsSubscription_Subscribe Subscribe) to a NWDAF 220.

In operation S220, the NWDAF 220 may determine whether to accept a subscription request for the service and may transfer a response message (e.g., Nnwdaf_AnalyticsSubscription_Subscribe Notify) to the consumer NF 210 in response to the subscription request.

In operation S230, the NWDAF 220 may transfer, to the consumer NF 210, an analysis result report message (e.g., Nnwdaf_AnalyticsNotification_Notify) for transferring of the analysis result requested by the consumer NF 210 via subscription.

According to an embodiment, if the subscription request of the consumer NF 210 is accepted, the NWDAF 220 may analyze data corresponding to a condition designated by the consumer NF 210. Thereafter, the NWDAF 220 may transfer the analyzed data to the consumer NF 210 at a designated period. The subscription may be initiated (or triggered) by the consumer NF 210. Thereafter, in response to a request of the consumer NF 210, a limited change to subscription information (e.g., type and reporting period of analysis data designated in the subscription procedure, etc.) may be allowed. Changing, renewing, or updating a subscription in the disclosure may refer to changing, renewing, or updating subscription information. Alternatively, changing, renewing, or updating a subscription may refer to changing, renewing, or updating the subscription itself (i.e., canceling an existing subscription and replacing the same with a new subscription).

Figure 3:
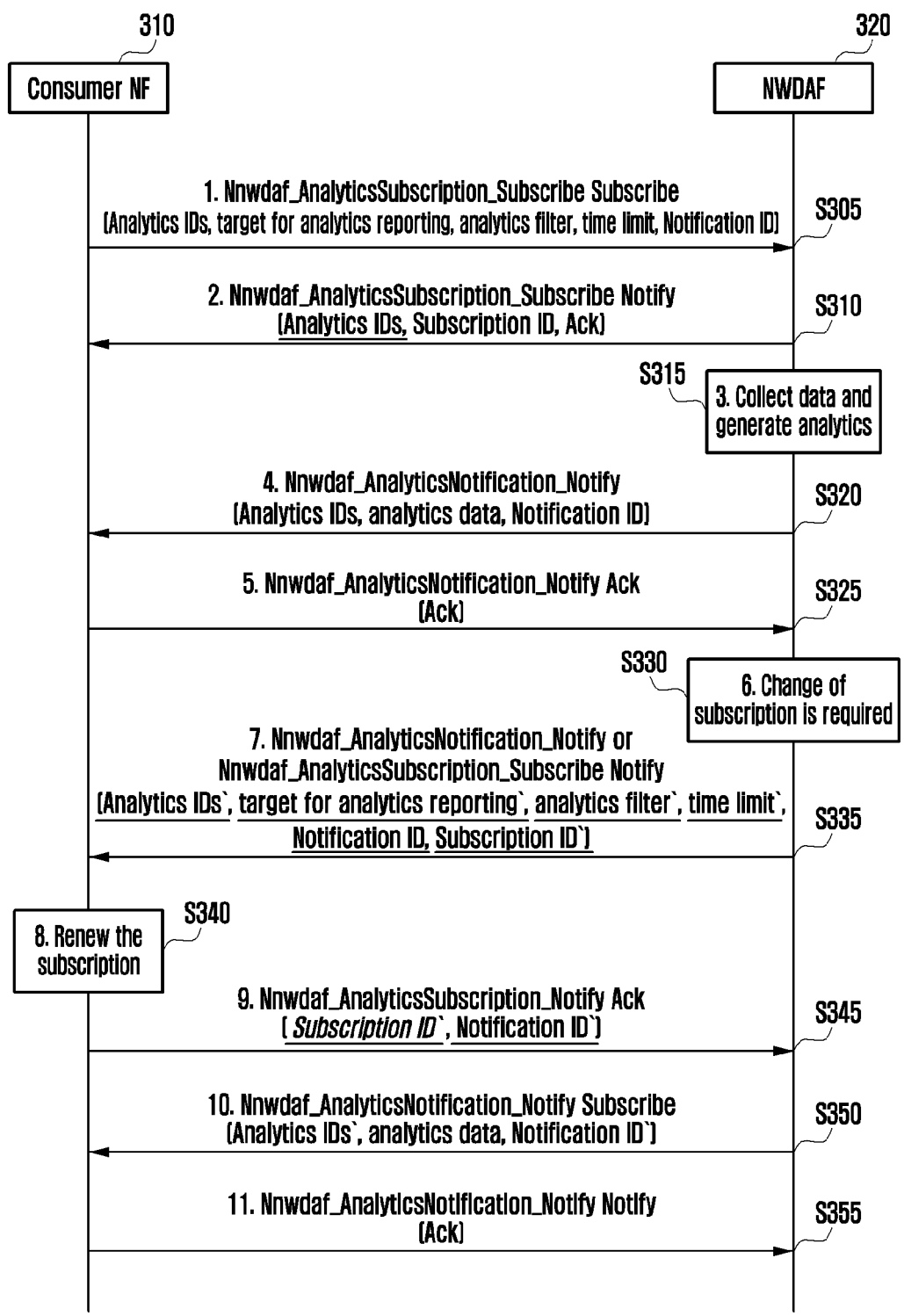
FIG. 3 is a flowchart illustrating a method of executing a subscription for data transmission or reception between a consumer network function and a network data analysis network function, and then renewing the subscription by a request of the network data analysis network function, according to an embodiment of the disclosure.

FIG. 3 is a flowchart illustrating a method of completing a subscription for data transmission or reception between a consumer NF and an NWDAF, and then renewing the subscription by a request of the NWDAF, according to an embodiment of the disclosure.

Referring to FIG. 3, in operation S305, a consumer network function (consumer NF) 310 may transmit a subscription request message (e.g., Nnwdaf_AnalyticsSubscription_Subscribe Subscribe) for a network data analysis service provided by a network data analytics function (NWDAF) 320, in order to request network data analysis. The subscription request message may include at least one piece of the following information (e.g., the information may be referred to as a subscription or subscription information).

One or more analytics IDs: Identifiers that indicate analysis information for which the consumer NF 310 requests data analysis.

Target for analytics reporting parameter: An analysis target may be indicated for each analytics ID.

Analytics filter: Information for limiting analysis information (e.g., a case of limiting to a specific network slice, a data network name (DNN), an area of interest, etc. may be included).

Time limit: Timing, such as an analysis period and a transmission period of an analysis result report message, may be designated.

Notification ID: An address designated by the consumer NF 310 with respect to a corresponding subscription to receive an analysis result report message (in addition, an IP address, a port number, etc. may be further included). The notification ID is an identifier for identifying the subscription in the consumer NF 310, and an IP address and a port number may refer to an address of a resource allocated to receive an analysis result report message from the NWDAF 320.

In operation S310, the NWDAF 320 may determine whether to accept the subscription request in consideration of an operator policy, a network state, a resource state, and the like, and may transmit a response message (e.g., Nnwdaf_AnalyticsSubscription_Subscribe Notify) in response to the subscription request to the consumer NF 310. The response message may include at least one of the following information.

Accepted one or multiple analytics IDs: Identifiers of analysis data accepted by the NWDAF 320 from among types of network data for which analysis has been requested by the consumer NF 310.

Subscription ID: An address allocated for the subscription by the NWDAF 320 (in addition, an IP address, a port number, etc. may be further included). The subscription ID is an identifier for identifying the subscription in the NWDAF 320, and an IP address and a port number may refer to an address of a resource allocated to receive a message for requesting a parameter change related to the subscription from the consumer NF 310. For the purpose of use in a procedure of changing the subscription, the NWDAF 320 may configure and store information on a correlation or mapping relationship between a notification ID designated by the consumer NF 310 and a subscription ID assigned by the NWDAF 320 itself for the subscription.

In operation S315, the NWDAF 320 may perform a procedure of collecting and analyzing network data necessary to obtain network data for which analysis has been requested by the consumer NF 310.

In operation S320, the NWDAF 320 may transfer, to the consumer NF 310, an analysis result message (e.g., Nnwdaf_AnalyticsNotification_Notify) for transferring of an analysis result for network data designated for the subscription. The analysis result report message may be transferred to the consumer NF 310 by using a notification ID, an IP address, and a port number designated by the consumer NF 310.

In operation S325, the consumer NF 310 may transfer, to the NWDAF 320, a response message (e.g., Nnwdaf_AnalyticsNotification_Notify Ack) to the analysis result report message.

In operation S330, the NWDAF 320 may determine that a situation in which a change to subscription information (or subscription) is required has occurred. This may be triggered by various conditions, such as moving of a terminal, a network state, and an internal resource state of the NWDAF 320. As a more specific example, this may be a case of occurrence of a situation in which a terminal related to the network data, for which analysis has been requested by the consumer NF 310, is out of a service range of the NWDAF 320 and it is thus no longer possible to collect data for the terminal. Also, this may be a situation in which an NF that provides, for analysis, network data for the terminal is broken or changed. Alternatively, a situation, in which a computing resource of the NWDAF 320 is exhausted, or a service range or a network data type that provides analysis is readjusted, etc. may be included. Of course, the disclosure is not limited to the aforementioned example, and the NWDAF 320 may determine that the subscription information (or subscription) needs to be changed according to other conditions.

In operation S335, the NWDAF 320 may transmit a message (hereinafter, simply referred to as a subscription change request message) for requesting to change, cancel, or replace the subscription information (or subscription) to the consumer NF 310, so as to change, cancel, or replace the subscription information (or subscription). For the subscription change request message, the aforementioned analysis result report message (e.g., Nnwdaf_AnalyticsNotification_Notify) may be extended to be used. Alternatively, for the subscription change request message, the aforementioned response message (e.g., Nnwdaf_AnalyticsSubscription_Subscribe Notify) to the subscription request may be extended to be used. Alternatively, the subscription change request message may define a separate message in addition to the aforementioned message. In order to change the subscription information (or subscription), the subscription change request message may include a newly designated analytics ID' (one or multiple analytics IDs can be included), a newly designated target for analytics reporting', a newly designated analytics filter', a newly designated time limit' parameter, and the like. When the NWDAF 320 allocates a new resource (changing all or some of subscription ID, IP address, port number, etc.) for the subscription and replaces the subscription with a new subscription, a newly designated subscription ID', a newly designated IP address', a newly designated port number', etc. which are subscription identifiers newly assigned by the NWDAF 320 may be included.

When the NWDAF 320 requests cancellation of the subscription, a separate indicator for indicating unsubscription may be included in the subscription change message (or unsubscription message) and transmitted. Alternatively, a scheme of not including an analytics ID is also possible.

The NWDAF 320 may transfer the subscription change message including the notification ID, which is designated in S305 by the consumer NF 310 to indicate the subscription information to be changed. Accordingly, the NWDAF 320 may transfer the subscription change message to the consumer NF 310 by using the IP address and the port number designated by the consumer NF 310.

In operation S340, the consumer NF 310 may extract the notification ID from the received subscription change message and may call the subscription information stored for the subscription. The consumer NF 310 may renew a correlation between the notification ID and the subscription ID by using the newly received subscription ID'. In relation to the subscription, the consumer NF 310 may store parameter values newly designated by the NWDAF 320.

In operation S345, the consumer NF 310 may transfer, to the NWDAF 320, a change result report message (e.g., Nnwdaf_AnalyticsSubscription_NotifyAck) for reporting a result of a subscription change requested by the NWDAF 320. The change result report message may include, in addition to a result of the change request, the subscription ID' newly designated by the NWDAF 320 in S335 to designate the subscription in the NWDAF 320. In the procedure of changing the subscription, there may be a case where the consumer NF 310 is to change the subscription by allocating a new resource (changing all or some of notification ID, IP address, port number, etc.) for the subscription. In this case, a notification ID' newly designated by the consumer NF 310 may be included in the change result report message.

When the consumer NF 310 is to cancel the subscription in response to the change request, the consumer NF 310 may include a separate indicator for indicating unsubscription in the change result report message.

Via the aforementioned procedures, with respect to the subscription, renewal (or renewal procedure) of the subscription information (or subscription) stored in the NWDAF 320 and the consumer NF 310 may be performed, and a subsequent data transmission or reception procedure may be performed using the renewed subscription information (or via the renewed subscription).

In operation S350, the NWDAF 320 may newly analyze network data by applying an analysis condition (i.e., changed or renewed subscription information) configured in the renewal procedure. Thereafter, the NWDAF 320 may transmit an analysis result report message (e.g., Nnwdaf_AnalyticsNotification_Notify Subscribe) for transferring of an analysis result to the consumer NF 310. In this case, in S345, the transfer may be performed using a notification ID' newly designated by the consumer NF 310.

In operation S355, the consumer NF 310 may transfer, to the NWDAF 320, a response message (e.g., Nnwdaf_AnalyticsNotification_Notify Notify) indicating that data has been successfully received.

Figure 4:
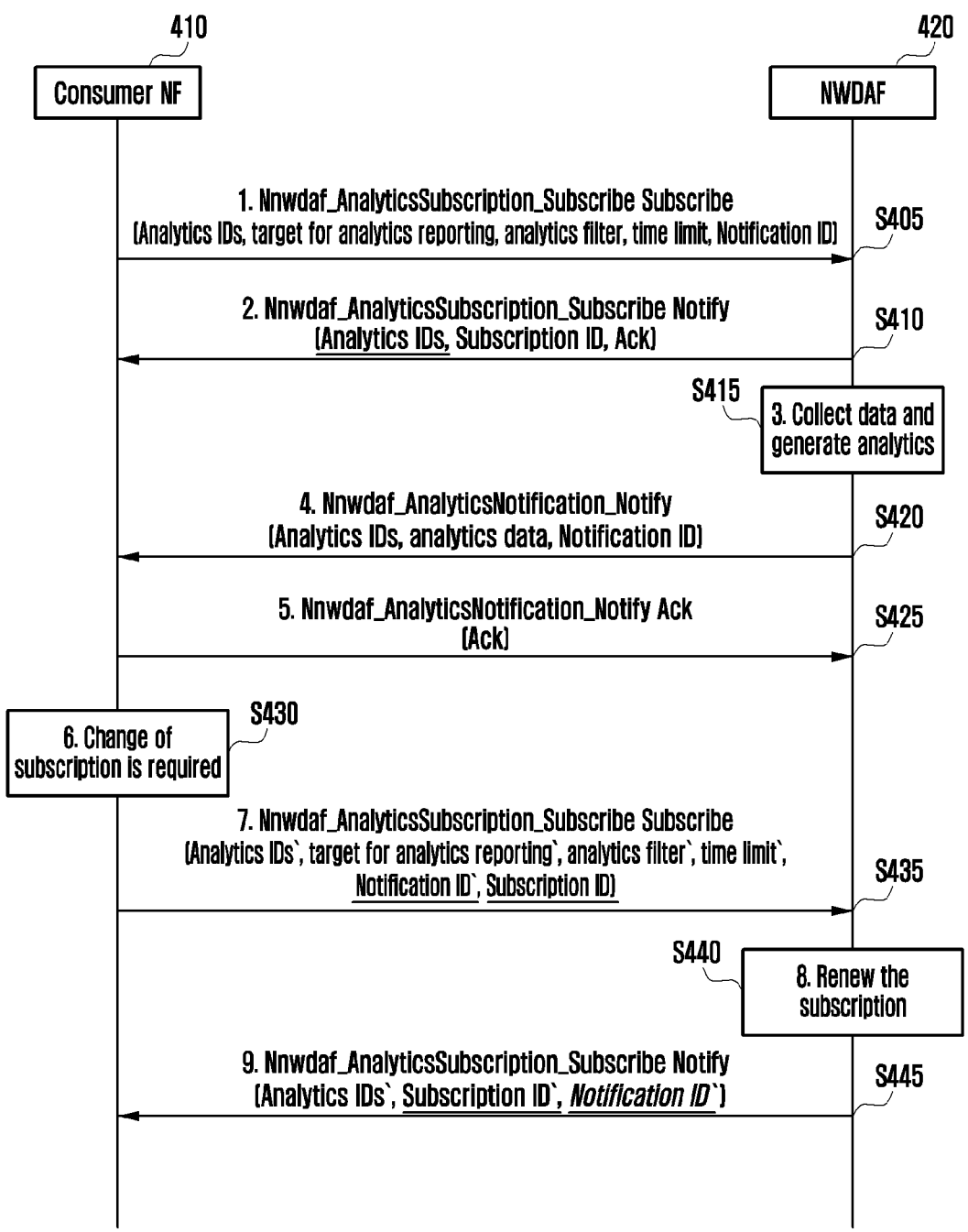
FIG. 4 is a flowchart illustrating a method of executing a subscription for data transmission or reception between a consumer network function and a network data analysis network function, and then renewing the subscription by a request of the consumer network function, according to an embodiment of the disclosure.

FIG. 4 is a flowchart illustrating a method of completing a subscription for data transmission or reception between a consumer NF and an NWDAF, and then renewing the subscription by a request of the consumer NF, according to an embodiment of the disclosure.

Referring to FIG. 4, in operation S405, a consumer network function (consumer NF) 410 may transmit a subscription request message (e.g., Nnwdaf_AnalyticsSubscription_Subscribe Subscribe) for a network data analysis service provided by a network data analytics function (NWDAF) 420, in order to request network data analysis. The subscription request message may include at least one piece of the following information (e.g., the information may be referred to as a subscription or subscription information).

One or multiple analytics IDs: Identifiers that indicate a type of analysis information for which the consumer NF 410 requests network data analysis.

Target for analytics reporting parameter: An analysis target may be indicated for each analytics ID.

Analytics filter: Information for limiting analysis information (e.g., a case of limiting to a specific network slice, a data network name (DNN), an area of interest, etc. may be included).

Time limit: Timing, such as an analysis period and a transmission period of an analysis result report message, may be designated.

Notification ID: An address designated by the consumer NF 410 with respect to a corresponding subscription to receive an analysis result report message (in addition, an IP address, a port number, etc. may be further included). The notification ID is an identifier for identifying the subscription in the consumer NF 410, and an IP address and a port number may refer to an address of a resource allocated to receive an analysis result report message from the NWDAF 420.

In operation S410, the NWDAF 420 may determine whether to accept the subscription request in consideration of an operator policy, a network state, a resource state, and the like, and may transmit a response message (e.g., Nnwdaf_AnalyticsSubscription_Subscribe Notify) in response to the subscription request to the consumer NF 410. The response message may include at least one of the following information.

Accepted one or multiple analytics IDs: Identifiers of analysis data accepted by the NWDAF 420 from among types of network data for which analysis has been requested by the consumer NF 410.

Subscription ID: An address allocated for the subscription by the NWDAF 420 (in addition, an IP address, a port number, etc. may be further included). The subscription ID is an identifier for identifying the subscription in the NWDAF 420, and an IP address and a port number may refer to an address of a resource allocated to receive a message for requesting a parameter change related to the subscription from the consumer NF 410. For the purpose of use in a procedure of changing the subscription, the NWDAF 420 may configure and store information on a correlation or mapping relationship between a notification ID designated by the consumer NF 410 and a subscription ID assigned by the NWDAF 320 itself for the subscription.

In operation S415, the NWDAF 420 may perform a procedure of collecting and analyzing network data necessary to obtain network data for which analysis has been requested by the consumer NF 410.

In operation S420, the NWDAF 420 may transfer, to the consumer NF 410, an analysis result message (e.g., Nnwdaf_AnalyticsNotification_Notify) for transferring of an analysis result for network data designated for the subscription. The analysis result report message may be transferred to the consumer NF 410 by using a notification ID, an IP address, and a port number designated by the consumer NF 410.

In S425, the consumer NF 410 may transfer, to the NWDAF 420, a response message (e.g., Nnwdaf_AnalyticsNotification_Notify Ack) to the analysis result report message.

In operation S430, the consumer NF 410 may determine that a situation in which a change of the subscription information (or subscription) is required has occurred. This may be triggered by various conditions, such as moving of a terminal, a network state, and an internal resource state of the consumer NF 410. As a more specific example, this may be a case of occurrence of a situation in which a terminal related to the network data, for which analysis has been requested by the consumer NF 410, is out of a service range of the consumer NF 410 and it is thus no longer necessary to collect data for the terminal. Alternatively, a situation, in which a computing resource of the consumer NF 410 is exhausted, a target required to be analyzed and a type of data required to be analyzed are changed, or a service range is readjusted, etc. may be included. Of course, the disclosure is not limited to the aforementioned example, and the consumer NF 410 may determine that the subscription information (or subscription) needs to be changed according to other conditions.

In operation S435, the consumer NF 410 may transmit a message (hereinafter, simply referred to as a subscription change request message) for requesting to change, cancel, or replace the subscription information (or subscription) to the NWDAF 420, so as to change, cancel, or replace the subscription information (or subscription). The subscription change request message may be, for example, Nnwdaf_AnalyticsSubscription_Subscribe Subscribe. In order to change the subscription information (or subscription), the subscription change request message may include a newly designated analytics ID' (one or multiple analytics IDs can be included), a newly designated target for analytics reporting', a newly designated analytics filter', a newly designated time limit' parameter, and the like. When the consumer NF 410 allocates a new resource (changing all or some of subscription ID, IP address, port number, etc.) for the subscription and replaces the subscription with a new subscription, a newly designated notification ID', a newly designated IP address', a newly designated port number', etc. which are subscription identifiers newly assigned by the consumer NF 410 may be included.

When the consumer NF 410 requests cancellation of the subscription, a separate indicator for indicating unsubscription may be included in the subscription change message (or unsubscription message) and transmitted. Alternatively, a scheme of not including an analytics ID is also possible.

The consumer NF 410 may transfer the subscription change message including the subscription ID, which is designated in S410 by the NWDAF 420 to designate the subscription information to be changed. Accordingly, the consumer NF 410 may transfer the subscription change message to the NWDAF 420 by using the IP address and the port number designated by the NWDAF 420.

In operation S440, the NWDAF 420 may extract the subscription ID from the received subscription change message and may call the subscription information stored for the subscription. The NWDAF 420 may renew a correlation between the notification ID and the subscription ID by using the newly received notification ID'. In relation to the subscription, the consumer NF 410 may store parameter values newly designated by the consumer NF 410.

In operation S445, the NWDAF 420 may transfer, to the consumer NF 410, a change result report message (e.g., Nnwdaf_AnalyticsSubscription_Subscribe Notify) for reporting a result of a subscription change requested by the consumer NF 410. The change result report message may include, in addition to a result of the change request, the notification ID' newly designated by the consumer NF 410 in S435 to designate the subscription in the consumer NF 410. In the procedure of changing the subscription, there may be a case where the NWDAF 420 is to change the subscription by allocating a new resource (changing all or some of notification ID, IP address, port number, etc.) for the subscription. In this case, a subscription ID' newly designated by the NWDAF 420 may be included in the change result report message.

When the NWDAF 420 is to cancel the subscription in response to the change request, the NWDAF 420 may include a separate indicator for indicating unsubscription in the change result report message.

Via the aforementioned procedures, with respect to the subscription, renewal (or renewal procedure) of the subscription information (or subscription) stored in the NWDAF 420 and the consumer NF 410 may be performed, and a subsequent data transmission or reception procedure may be performed using the renewed subscription information (or via the renewed subscription).

The messages used in FIGS. 3 and 4 are examples of a proposed method, implementation using the same message in the subscription configuration and change procedures is also possible, and the use of a specific message to transfer a parameter designating a change is irrelevant to the original intention of the disclosure.

Figure 5:
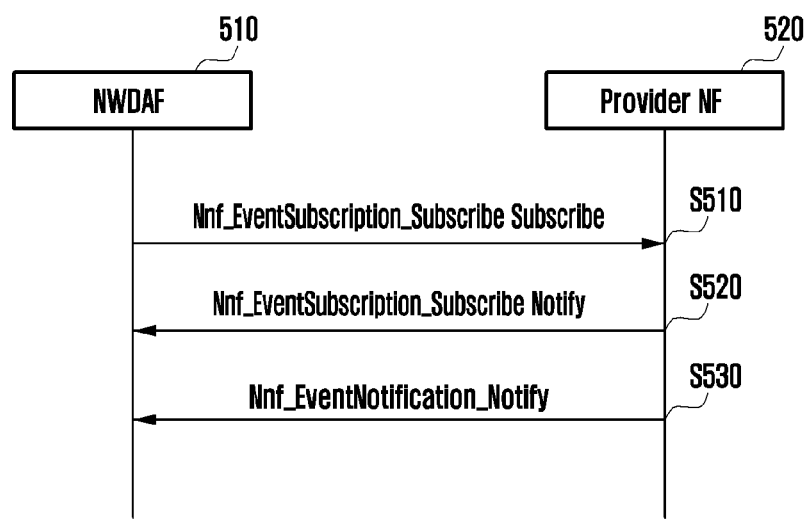
FIG. 5 is a flowchart illustrating a subscription procedure for a data providing service performed between a network data analysis network function and a provider network function in order to collect necessary data from a network function, according to an embodiment of the disclosure.

FIG. 5 is a flowchart illustrating a subscription procedure for a data providing device performed between a provider NF and a consumer NF to request providing of data to be analyzed for network data analysis.

Referring to FIG. 5, a consumer NF that requests a data providing service may be an NWDAF 510. A provider NF 520 may provide the data providing service requested by the NWDAF 510.

Referring to FIG. 5, in operation S510, the NWDAF 510 may transfer, to the provider NF 520, a subscription request message (e.g., Nnf_EventSubscription_Subscribe Subscribe) for the data providing service provided by the provider NF.

In operation S520, the provider NF 520 may determine whether to accept a subscription request for the service and may transfer a response message (e.g., Nnf_EventSubscription_Subscribe Notify) to the NWDAF 510 in response to the subscription request.

In operation S530, the provider NF 520 may transfer, to the NWDAF 510, a data providing message (e.g., Nnf_EventNotification_Notify) for providing data requested and collected by the NWDAF 510 via a subscription.

According to an embodiment, if the subscription request of the NWDAF 510 is accepted, the provider NF 520 may collect network data corresponding to a condition designated by the NWDAF 510. Thereafter, the provider NF 520 may transfer data collected at a designated period to the NWDAF 510. The subscription procedure may be initiated (or triggered) by the NWDAF 510. Thereafter, in response to a request of the NWDAF 510, a limited change to subscription information (e.g., type and reporting period of analysis data designated in the subscription procedure, etc.) may be allowed.

According to another embodiment, after completing subscription for data transmission or reception between the NWDAF 510 and the provider NF 520, the method proposed in FIG. 3 or FIG. 4 and the description thereof is applicable for a method of renewing/changing/canceling a subscription at the request of the provider NF 520 or the NWDAF 510. More specifically, the consumer NF 310 or 410 of FIG. 3 or 4 may be replaced with the NWDAF 510 of FIG. 5, and the NWDAF 320 or 420 of FIG. 3 or 4 may be replaced with the provider NF 520 of FIG. 5. The aforementioned information or messages for data analysis may be understood by replacement of the same with information or messages for data collection. Through this, it is possible to apply the method applied to the subscription change procedure for the network data analysis service described in FIG. 3 or FIG. 4 to the subscription change procedure for the network data collection service described in FIG. 5.

Figure 6:
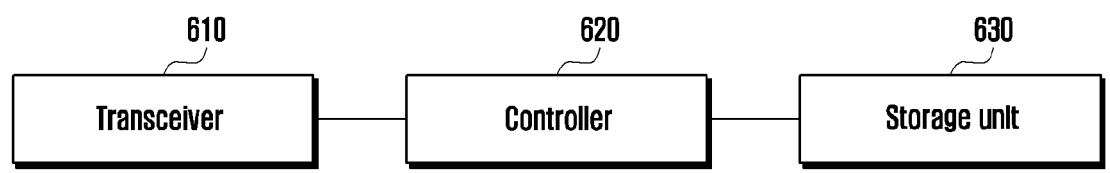
FIG. 6 is a diagram illustrating a structure of a network entity performing a consumer network function, according to an embodiment of the disclosure.

FIG. 6 is a diagram illustrating a structure of a network entity performing a consumer network function, according to an embodiment of the disclosure.

Referring to FIG. 6, a network entity that performs a consumer network function may include a transceiver 610, a controller 620, and a storage unit 630. In the disclosure, the controller may be defined as a circuit, an application-specific integrated circuit, or at least one processor.

The transceiver 610 may transmit a signal to or receive a signal from another network entity. The transceiver 610 may, for example, transmit or receive a signal or a message to or from a network entity that performs a provider network function.

The controller 620 may control overall operations of the network entity that performs a consumer network function according to an embodiment proposed in the disclosure. For example, the controller 620 may control signal flows between respective blocks to perform operations according to the aforementioned flowchart. Specifically, the controller 620 may control operations proposed in the disclosure in order to renew a subscription for receiving network analysis data according to an embodiment of the disclosure.

Specifically, the controller 620 of the network entity configured to perform the consumer network function according to the disclosure may control the transceiver 610 to transmit, to a provider NF, a first message including subscription information for requesting a subscription to a network data analysis service, control the transceiver 610 to receive a second message including information on acceptance of the subscription request from the provider NF in response to the first message, control the transceiver 610 to receive a third message including subscription information changed based on a preconfigured condition from the provider NF, and control to perform a renewal procedure for the subscription on the basis of the changed subscription information.

The storage unit 630 may store at least one of information transmitted or received via the transceiver 610 and information generated via the controller 620.

Figure 7:
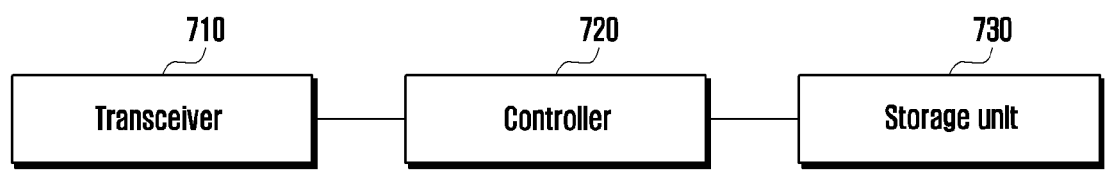
FIG. 7 is a diagram illustrating a structure of a network entity performing a provider network function, according to an embodiment of the disclosure.

FIG. 7 is a diagram illustrating a structure of a network entity performing a provider network function, according to an embodiment of the disclosure.

Referring to FIG. 7, a network entity that performs a provider network function may include a transceiver 710, a controller 720, and a storage unit 730. In the disclosure, the controller may be defined as a circuit, an application-specific integrated circuit, or at least one processor.

The transceiver 710 may transmit a signal to or receive a signal from another network entity. The transceiver 710 may, for example, transmit or receive a signal or a message to or from a network entity that performs a consumer network function.

The controller 720 may control overall operations of the network entity that performs a provider network function according to an embodiment proposed in the disclosure. For example, the controller 720 may control signal flows between respective blocks to perform operations according to the aforementioned flowchart. Specifically, the controller 720 may control operations proposed in the disclosure in order to renew a subscription for receiving network analysis data according to an embodiment of the disclosure.

Specifically, the controller 720 of the network entity configured to perform the provider network function according to the disclosure may control the transceiver 710 to receive, from a consumer NF, a first message including subscription information for requesting a subscription to a network data analysis service, control the transceiver 710 to transmit, to the consumer NF, a second message including information on acceptance of the subscription request in response to the first message, control to determine a change of the subscription on the basis of a preconfigured condition, and control the transceiver 710 to transmit a third message including the changed subscription information to the consumer NF.

The storage unit 730 may store at least one of information transmitted or received via the transceiver 710 and information generated via the controller 720.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first network function (NF) in a wireless communication system, the method comprising:
   receiving, from a second NF, a first message for requesting a subscription to a network data analysis service, the first message comprising first subscription information requested for the subscription and a notification identifier associated with the subscription;
   in response to the first message, transmitting, to the second NF, a second message for accepting the subscription, the second message comprising second subscription information accepted for the subscription and a first subscription identifier mapped to the notification identifier;

determining to change the second subscription information to third subscription information based on a predetermined condition; and transmitting, to the second NF, a third message comprising the third subscription information, the notification identifier, and a second subscription identifier replacing the first subscription identifier and mapped to the notification identifier, wherein the first NF is a network data analytics function (NWDAF).

2. The method of claim 1, further comprising:
performing an analysis on network data based on the second subscription information;
transmitting, to the second NF, a message comprising information on a result of the analysis; and
receiving, from the second NF, a response message to the result of the analysis.

3. The method of claim 1,
wherein the first subscription information comprises at least one identifier indicating at least one type of network data requested to be analyzed, and
wherein the second subscription information comprises at least one identifier indicating at least one type of network data accepted to be analyzed from among the at least one type of network data requested to be analyzed.

4. The method of claim 1, further comprising:
receiving, from the second NF, a fourth message comprising information on a result of a renewal of the subscription, the renewal being based on the third subscription information, notification identifier, and the second subscription identifier.

5. The method of claim 1, further comprising:
performing an analysis on network data based on the third subscription information.

6. A method performed by a second network function (NF) in a wireless communication system, the method comprising:
transmitting, to a first NF, a first message for requesting a subscription to a network data analysis service, the first message comprising first subscription information requested for the subscription and a notification identifier associated with the subscription;
in response to the first message, receiving, from the first NF, a second message for accepting the subscription, the second message comprising second subscription information accepted for the subscription and a first subscription identifier mapped to the notification identifier;
receiving, from the first NF, a third message comprising third subscription information being changed from the second subscription information based on a predetermined condition, the notification identifier, and a second subscription identifier replacing the first subscription identifier and mapped to the notification identifier; and
renewing the subscription based on the third subscription information, the notification identifier, and the second subscription identifier,
wherein the first NF is a network data analytics function (NWDAF).

7. The method of claim 6, further comprising:
receiving, from the first NF, a message comprising information on a result of an analysis on network data which is based on the second subscription information; and
transmitting, to the first NF, a response message to the result of the analysis.

8. The method of claim 6,
wherein the first subscription information comprises at least one identifier indicating at least one type of network data requested to be analyzed, and
wherein the second subscription information comprises at least one identifier indicating at least one type of network data accepted to be analyzed from among the at least one type of network data requested to be analyzed.

9. The method of claim 6, further comprising:
transmitting, to the first NF, a fourth message comprising information on a result of the renewal of the subscription.

10. The method of claim 6, further comprising:
receiving, from the first NF, a message comprising information on a result of an analysis on network data which is based on the third subscription information.

11. A first network function (NF) in a wireless communication system, the first NF comprising:
a transceiver; and
at least one processor configured to:
receive, from a second NF via the transceiver, a first message for requesting a subscription to a network data analysis service, the first message comprising first subscription information requested for the subscription and a notification identifier associated with the subscription,
in response to the first message, transmit, to the second NF via the transceiver, a second message for accepting the subscription, the second message comprising second subscription information accepted for the subscription and a first subscription identifier mapped to the notification identifier,
determine to change the second subscription information to third subscription information based on a predetermined condition, and
transmit, to the second NF via the transceiver, a third message comprising the third subscription information, the notification identifier, and a second subscription identifier replacing the first subscription identifier and mapped to the notification identifier,
wherein the first NF is a network data analytics function (NWDAF).

12. The first NF of claim 11, wherein the at least one processor is further configured to:
perform an analysis on network data based on the second subscription information,
transmit, to the second NF via the transceiver, a message comprising information on a result of the analysis, and
receive, from the second NF via the transceiver, a response message to the result of the analysis.

13. The first NF of claim 11,
wherein the first subscription information comprises at least one identifier indicating at least one type of network data requested to be analyzed, and
wherein the second subscription information comprises at least one identifier indicating at least one type of network data accepted to be analyzed from among the at least one type of network data requested to be analyzed.

14. The first NF of claim 11, wherein the at least one processor is further configured to:

receive, from the second NF via the transceiver, a fourth message comprising information on a result of a renewal of the subscription, the renewal being based on the third subscription information, the notification identifier, and the second subscription identifier.

15. The first NF of claim 11, wherein the at least one processor is further configured to:
perform an analysis on network data based on the third subscription information.

16. A second network function (NF) in a wireless communication system, the second NF comprising:
a transceiver; and
at least one processor configured to:
transmit, to a first NF via the transceiver, a first message for requesting a subscription to a network data analysis service, the first message comprising first subscription information requested for the subscription and a notification identifier associated with the subscription,
in response to the first message, receive from the first NF via the transceiver, a second message for accepting the subscription, the second message comprising second subscription information accepted for the subscription and a first subscription identifier mapped to the notification identifier,
receive, from the first NF via the transceiver, a third message comprising third subscription information being changed from the second subscription information based on a predetermined condition, the notification identifier, and a second subscription identifier replacing the first subscription identifier and mapped to the notification identifier, and
renew the subscription based on the third subscription information, the notification identifier, and the second subscription identifier,
wherein the first NF is a network data analytics function (NWDAF).

17. The second NF of claim 16, wherein the at least one processor is further configured to:
receive, from the first NF, a message comprising information on a result of an analysis on network data which is based on the second subscription information, and
transmit, to the first NF, a response message to the result of the analysis.

18. The second NF of claim 16,
wherein the first subscription information comprises at least one identifier indicating at least one type of network data requested to be analyzed, and
wherein the second subscription information comprises at least one identifier indicating at least one type of network data accepted to be analyzed from among the at least one type of network data requested to be analyzed.

19. The second NF of claim 16, wherein the at least one processor is further configured to:
transmit, to the first NF via the transceiver, a fourth message comprising information on a result of the renewal of the subscription.

20. The second NF of claim 16, wherein the at least one processor is further configured to:
receive, from the first NF via the transceiver, a message comprising information on a result of an analysis on network data which is based on the third subscription information.

* * * * *